3,002,920
HYDROFORMING CATALYST AND PROCESS

Walter James Porter, Jr., Warren Maxwell Smith, and Robert Edward Schexnailder, Jr., all of Baton Rouge, La., assignors to Esso Research and Engineering Company, a corporation of Delaware
No Drawing. Filed Dec. 10, 1958, Ser. No. 779,278
3 Claims. (Cl. 208—138)

This application relates to novel platinum-group metal catalysts and to a method employing said catalysts for hydroforming naphtha fractions to produce high octane number motor fuels. More particularly, this invention pertains to novel platinum-group metal catalysts, preferably platinum per se upon alumina supports which are stabilized by the incorporation of relatively small amounts of a stabilizer substance.

Platinum catalysts are well known and widely used for the treatment of hydrocarbon fractions boiling in the motor gasoline range under hydroforming reaction conditions in order to produce high octane number, clean-burning gasolines. In view of the high costs of platinum-alumina hydroforming catalysts it is necessary, to compete economically, that such catalysts possess high activity, so that large amounts of naphtha feed can be charged to a given conversion unit per unit of time. These catalysts must, in addition to high activity, also possess good selectivity or be able to produce high yields of high octane number products with small production of normally gaseous or solid carbonaceous by-products. It is also necessary that these catalysts possess good stability so that they retain good activity and selectivity characteristics during prolonged periods of operation, and when necessary, that they be capable of regeneration and/or reactivation by burning carbonaceous deposits therefrom and treating the essentially carbon-free catalyst with oxygen-containing and/or chlorine-containing gas. The latter property is of the utmost importance since it is only by going to relatively drastic reaction conditions that desired octane number products are produced, and under these reaction conditions, regeneration and reactivation of the catalyst is required at very frequent intervals.

It has been previously proposed to add activators or promoters to hydroforming catalysts consisting of platinum dispersed or supported upon a carrier. U.S. Pat. No. 2,814,599, for example, proposes to add a compound of a group III metal having an atomic number of at least 21 and not more than 89 as an activating agent. Within this group of compounds it has been found that while gallium effects a substantial activation of a platinum-alumina catalyst, yttrium actually deactivates such catalysts.

It has now been found that the stability with respect to platinum crystallite formation of platinum-alumina reforming catalysts can be improved remarkably by impregnation of zirconia upon the surface of the platinum-alumina catalyst. It has been found that while the zirconia tends to lower the initial activity of the fresh catalyst, the presence of small amounts of zirconia does a remarkably good job of reducing the rate of deactivation of platinum-alumina reforming catalysts when the zirconia is impregnated upon the surface of the carrier. It is known that active platinum hydroforming catalysts are characterized by having the platinum widely distributed (high platinum surface area) while the deactivated catalyst has low platinum surface area with the platinum in the form of large crystallites (larger than 50 Angstrom units diameter and frequently as large as 150 to 200 Angstrom units). This platinum crystallite growth is attributable to the fact that migration temperature for platinum upon alumina supports is about 900° F. (lower than normal hydroforming temperature).

It is believed that by impregnating zirconia upon the surface of a platinum on alumina catalyst that the migration temperature of the platinum is raised very substantially thereby improving the stability of the catalyst by inhibiting platinum crystal growth.

The catalysts which are improved in stability in accordance with the present invention are those consisting essentially of a platinum group metal, preferably platinum per se, distributed upon an adsorptive alumina-containing support or carrier. Preferably the support material is a high purity alumina in the eta crystal form derived by hydrolyzing aluminum alcoholate, drying and calcining in known manner. The platinum-alumina catalyst can be prepared by compositing a platinum group metal compound with adsorptive alumina, i.e. after the alumina hydrate has been calcined to fix or establish the structure of the adsorptive alumina in any known manner. The simplest method is merely to impregnate the calcined alumina with a suitable solution, for example, a solution of chloroplatinic acid. More uniform distribution of the platinum on the alumina can be achieved by suspending the alumina in an excess of deionized water and slowly adding the solution of the platinum compound to the dilute slurry with stirring, or the dry alumina may be mixed directly with the solution of the platinum compound. The impregnated alumina is separated from any excess liquid, dried at about 250° F. and calcined at about 1000 to 1200° F. for from about 1 to 24 hours. The catalysts contain the platinum group metal in the usual amounts, i.e., about 0.01 to 5% by weight, preferably about 0.1 to 1.0 wt. percent in the case of platinum per se.

The zirconia is composited with the catalyst by wet impregnation simultaneously with or subsequent to the impregnation with the platinum group metal compound. Suitable salts for the preparation of an impregnation solution are zirconyl halides, preferably zirconyl chloride and zirconyl nitrate. Any compound of zirconium can be used which will readily decompose to zirconia upon calcination and which does not leave deactivating decomposition products as would be the case with the sulfate. The amount of zirconium compound added should be sufficient to provide from about 0.05 to 5.0 wt. percent zirconia, preferably about 0.5 to 2.5 wt. percent zirconia in the catalyst composition. After completion of the impregnation, the catalyst is dried and calcined at 1000–1200° F. for 1 to 24 hours. Ordinarily it is preferred to incorporate the zirconium compound in the catalyst at the same time that the platinum compound is added in order to avoid an extra drying and calcination step. The catalyst is desirably given a short treatment with hydrogen before use in the reforming of hydrocarbon fractions. This is conveniently effected by bringing the catalyst up to conversion conditions of temperature and pressure in the presence of a hydrogen-containing gas.

The catalysts prepared in accordance with the present invention are particularly adapted for reforming hydrocarbon fractions boiling in the naphtha boiling range, or from about 150°–200° F. to about 400° F. The reforming can be effected in fixed, moving or fluidized beds as known in the art. In the fluidized solids operation, it is preferred to use a dilute catalyst prepared by first making a catalyst concentrate by compositing about 0.2 to 1.0 wt. percent platinum and 0.5 to 5.0 wt. percent zirconia with an adsorptive alumina and then mixing one part of this catalyst concentrate with several parts, for example, nine parts of unplatinized calcined alumina.

Reforming of naphtha feeds is effected by contacting feed naphtha in the vapor phase with the catalysts of this invention at temperatures between about 800 and 1000° F., pressures of from 100 to 1000 p.s.i.g. at hourly space velocities of about 0.5 to 10 and in the presence of from about 2,000 to 10,000 s.c.f./b. of hydrogen or hydrogen-rich recycle gas. It is preferred to utilize these catalysts at pressures below about 450 p.s.i.g. in order to obtain the maximum benefit of their greater stability.

The following examples are illustrative of the present invention.

EXAMPLE 1

Aluminum amylate solution was hydrolyzed in the presence of acetic acid as per U.S. Pat. No. 2,656,321 and the resultant alumina hydrosol formed upon heating was spray dried to produce alcoholate alumina gel particles. The latter were calcined for 6 hours at 1100° F.

Fifty grams of the calcined alumina were suspended as a dilute slurry in deionized water and 50 cc. of a solution comprising 0.15 g. Pt (as $PtCl_4$) were slowly added to the slurry. The excess liquid was decanted and the impregnated alumina was dried and calcined for 4 hours at 1000° F.

EXAMPLE 2

One part by weight of the catalyst of Example 1 was mixed with 9 parts by weight of alumina gel particles prepared as per Example 1 and which were calcined at 1500° F. for 16 hours. This catalyst is designated as catalyst A. Another part by weight of the catalyst of Example 1 was heated for 24 hours at 1200° F. and mixed with 9 parts by weight of the 1500° F. heat treated alumina gel. This catalyst is designated catalyst B.

EXAMPLE 3

A sample of the catalyst of Example 1 was impregnated with a solution of zirconyl nitrate in sufficient amount to incorporate 0.5 wt. percent $ZrO_2$. One part of the zirconia impregnated catalyst concentrate was calcined for 16 hours at 1000° F. and mixed with nine parts of alcoholate alumina gel that had been calcined for 16 hours at 1500° F. This catalyst is designated as catalyst C. Another part of the zirconia impregnated catalyst concentrate was calcined for 24 hours at 1200° F. and then mixed with nine parts of alcoholate alumina gel that was calcined for 16 hours at 1500° F. This catalyst is designated as catalyst D.

EXAMPLE 4

Catalysts designated as catalysts E and F were prepared in the same manner as catalysts C and D, respectively, of Example 3 except for the fact that the impregnation with zirconyl nitrate was in sufficient amount to provide 5.0 wt. percent zirconia rather than 0.5 wt. percent in the catalyst concentrate.

EXAMPLE 5

Each of the above catalysts was used to hydroform a heavy virgin naphtha at 200 p.s.i.g., 910° F. sand bath temperature with 2000 cu. ft./b. of dry hydrogen in a four-hour period. Catalyst A was considered the standard and is rated at 100% activity. The relative activity of the other catalysts is set out in Table 1.

Table 1

| Catalyst | Relative Activity | Percent Activity Loss Upon Heating |
|---|---|---|
| A | 100 | |
| B | 57 | −43 |
| C | 76 | |
| D | 66 | −13 |
| E | 71 | |
| F | 61 | −14 |

It may be readily seen from this data that the catalysts containing zirconia in accordance with this invention were much more stable or showed much smaller losses in activity when heated to 1200° F.

EXAMPLE 6

A platinum alumina catalyst was prepared as described in Example 1 except that the amount of platinum compound added was only sufficient to provide 0.03 wt. percent platinum uniformly impregnated upon the alumina which had been previously calcined at 1500° F. for 16 hours. One portion of this low platinum content catalyst was then impregnated with 0.1 wt. percent zirconia and another portion was impregnated with 0.5 wt. percent zirconia. Part of each of these catalysts was heated for four hours at 1000° F. and the remainder of each was heated for 24 hours at 1200° F. The activity of each of these catalysts was then tested under the same test conditions as described in EXAMPLE 5, and is compared with the activity of catalyst A above as the standard. The results are summarized in Table II.

Table II

| Stabilizer | Percent Activity of Catalyst A Heated 4 Hours at 1,000° F. | Percent Activity of Catalyst A Heated 24 Hrs at 1,200° F. | Percent Activity Loss on Heating |
|---|---|---|---|
| None | 92 | 41 | −55 |
| 0.1% $ZrO_2$ | 65 | 66 | +1 |
| 0.5% $ZrO_2$ | 70 | 67 | −4 |

This again shows that small amounts of zirconia effect a substantial improvement in the heat stability of the catalysts.

The foregoing description contains a limited number of embodiments of the present invention. It will be understood that numerous variations are possible without departing from the scope of this invention as defined in the following claims.

What is claimed is:

1. A method of reforming hydrocarbon fractions boiling in the naphtha boiling range which comprises contacting naphtha vapors in admixture with hydrogen at temperatures of from 800 to 1000° F. and pressures of from 100 to 1000 p.s.i.g. with a catalyst consisting essentially of from about 0.01 to 5.0 wt. percent of a platinum group metal in combination with from 0.05 to 5.0 wt. percent zirconia supported upon an adsorptive alumina carrier and periodically burning carbonaceous deposits from the catalyst by contact with an oxygen-containing gas at elevated temperatures.

2. A method of reforming hydrocarbon fractions boiling in the naphtha boiling range, which comprises contacting naphtha vapors in admixture with hydrogen at temperatures of from 800 to 1000° F. and pressures of from 100 to 1000 p.s.i.g. with a catalyst consisting essentially of from 0.01 to 1.0 wt. percent platinum in combination with from 0.05 to 5% zirconia supported upon an adsorptive alumina carrier and periodically burning carbonaceous deposits from the catalyst by contact with an oxygen-containing gas at elevated temperatures.

3. A method of reforming hydrocarbon fractions boiling in the naphtha boiling range which comprises contacting naphtha vapors in admixture with hydrogen at temperatures of from 800° to 1000° F. and pressures of from 100 to 1000 p.s.i.g. with a catalyst consisting essentially of 0.2 to 1.0 wt. percent platinum and 0.5 to 5.0 wt. percent zirconia supported upon an adsorptive alumina carrier in finely divided form intimately mixed with several times the amount of unplatinized adsorptive alumina and periodically burning carbonaceous deposits from the catalyst by contact with an oxygen-containing gas at elevated temperatures.

References Cited in the file of this patent

UNITED STATES PATENTS

| | | |
|---|---|---|
| 2,478,916 | Haensel et al. | Aug. 16, 1948 |
| 2,861,959 | Thorn et al. | Nov. 25, 1958 |
| 2,897,137 | Schwarzenbek | July 28, 1959 |